US009722702B2

(12) United States Patent
Choi et al.

(10) Patent No.: US 9,722,702 B2
(45) Date of Patent: Aug. 1, 2017

(54) SATA HOST BUS ADAPTER USING OPTICAL SIGNAL AND METHOD FOR CONNECTING SATA STORAGE USING THE SAME

(71) Applicant: ELECTRONICS AND TELECOMMUNICATIONS RESEARCH INSTITUTE, Daejeon (KR)

(72) Inventors: Yong-Seok Choi, Daejeon (KR); Hyuk-Je Kwon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 15/066,008

(22) Filed: Mar. 10, 2016

(65) Prior Publication Data

US 2016/0365924 A1    Dec. 15, 2016

(30) Foreign Application Priority Data

Jun. 15, 2015 (KR) .................... 10-2015-0084036

(51) Int. Cl.
*H04B 10/25* (2013.01)
*H04B 10/516* (2013.01)

(52) U.S. Cl.
CPC ......... *H04B 10/25* (2013.01); *H04B 10/5161* (2013.01)

(58) Field of Classification Search
CPC .......................... H04B 10/25; H04B 10/5161
See application file for complete search history.

(56) References Cited

U.S. PATENT DOCUMENTS

| 6,421,343 B1 | 7/2002 | Jun et al. | |
| 2007/0011536 A1* | 1/2007 | Khanna | G06F 11/27 714/733 |
| 2009/0279889 A1* | 11/2009 | Kirkpatrick | H04B 10/25752 398/41 |
| 2010/0070673 A1 | 3/2010 | Jung et al. | |

FOREIGN PATENT DOCUMENTS

| KR | 10-2011-0053535 A | 5/2011 |
| KR | 10-1444846 B1 | 9/2014 |

* cited by examiner

*Primary Examiner* — Leslie Pascal
(74) *Attorney, Agent, or Firm* — NSIP Law

(57) ABSTRACT

Disclosed herein are a SATA host bus adapter using a optical signal and a method for connecting SATA storage using the optical signal. The SATA host bus adapter includes: a first conversion unit for converting a PCI-Express signal, transmitted from a host computer, into a data signal, using a protocol defined in a bus; a optical signal conversion unit for converting the data signal into a optical signal and for transmitting the optical signal to a optical signal reception unit; and a second conversion unit for converting the optical signal, received by the optical signal reception unit, into the data signal, for converting the data signal into a SATA signal, using the protocol, and for transmitting the SATA signal to the SATA storage.

18 Claims, 14 Drawing Sheets

SATA HOST BUS ADAPTER USING OPTICAL SIGNAL AND METHOD FOR CONNECTING SATA STORAGE USING THE SAME

CROSS REFERENCE TO RELATED APPLICATION

This application claims the benefit of Korean Patent Application No. 10-2015-0084036, filed Jun. 15, 2015, which is hereby incorporated by reference in its entirety into this application.

BACKGROUND OF THE INVENTION

1. Technical Field

The present invention relates to a technique for connecting a host computer constituting a server and SATA storage using a optical signal.

2. Description of the Related Art

As existing means for connecting storage devices, Parallel ATA (PATA) is widely used at the PC level, and Small Computer System Interface (SCSI) is widely used at the server level. Also, in order to provide a high-bandwidth storage connection network between high-end servers, Fibre Channel (FC), which is high-speed network technology for connecting storage devices, has been introduced. FC has the advantages of high bandwidth, simple connection, and increased distance. However, because it is expensive and uses a complicated protocol, it is primarily used in environments that are less sensitive to cost, for example, data centers. Meanwhile, with the development in computer systems, internal and external I/O connections use high-speed serial signals rather than parallel signals (for example, PCI is substituted by PCI Express, COM ports and LPT ports are substituted by USB, and Front-Side Bus (FSB) is substituted by HyperTransport or QuickPath Interconnect (QPI)). Also, the storage connection methods PATA and SCSI have been developed into Serial ATA (SATA) and Serial Attached SCSI (SAS), and SATA and SAS are now widely used in PCs and servers. Because SATA and SAS have a less complicated design and a high bandwidth, and may be implemented at low cost, they may be applied to high-performance computing environments such as data centers. However, due to the characteristics of electrical signals, the distance is limited. Consequently, a system using multiple storage devices is required to be adjacent to a computing node, and thus SATA and SAS may not replace FC.

Korean Patent No. 1444846 disclosed a technique in which, when a monitoring camera and a host device communicate with each other, mutual communication is performed using FCP (Fibre Channel Protocol) and a host bus adapter.

However, Korean Patent No. 1444846 disclosed only a technique for mutual communication using FCP, and did not disclose a technique for effectively connecting a host computer and SATA storage via FCP or for reducing the connection cost.

Consequently, as requirements for storage space for accommodating huge amounts of data increase, it is necessary to provide a technique for reducing connection costs when a host computer and SATA storage are connected.

SUMMARY OF THE INVENTION

An object of the present invention is to enable SATA storage and a host computer to connect to each other using a optical signal.

Another object of the present invention is to provide a method for performing data processing using a protocol that may accommodate both PCI-e signals and SATA signals.

A further object of the present invention is to reduce the number of expensive PCI-e switches to be used, and to increase the connection distance between SATA storage and a host computer.

Yet another object of the present invention is to apply an existing core link between PCI-e and a bus to an existing connection between SATA storage and a host computer.

In order to accomplish the above object, a SATA host bus adapter using a optical signal, according to the present invention, includes: a first conversion unit for converting a PCI-Express signal, transmitted from a host computer, into a data signal, using a protocol defined in a bus; a optical signal conversion unit for converting the data signal into a optical signal, and for transmitting the optical signal to a optical signal reception unit; and a second conversion unit for converting the optical signal, received by the optical signal reception unit, into the data signal, for converting the data signal into a SATA signal, using the protocol, and for transmitting the SATA signal to SATA storage.

The protocol may accommodate the PCI-Express signal and the SATA signal.

The optical signal conversion unit may include a connection control unit for controlling connection of the first conversion unit and the second conversion unit, based on the optical signal.

The connection control unit may control data exchange between the first conversion unit and the second conversion unit, based on the optical signal that includes one or more of a control signal, a data write signal, and a data read signal.

The control signal may a signal including a link number, a lane number, whether a link is connected, whether a lane is connected, a residual buffer capacity of the first conversion unit, and a residual buffer capacity of the second conversion unit.

The connection control unit may control connection of the host computer and the SATA storage by repeatedly transmitting the control signal.

The optical signal conversion unit may transmit the optical signal to the second conversion unit, based on the residual buffer capacity of the second conversion unit.

Also, a SATA host bus adapter using a optical signal, according to the present invention, includes: a first conversion unit for converting a SATA signal, transmitted from SATA storage, into a data signal using a protocol defined in a bus; a optical signal conversion unit for converting the data signal into a optical signal and for transmitting the optical signal to a optical signal reception unit; and a second conversion unit for converting the optical signal, received by the optical signal reception unit, into a data signal, for converting the data signal into a PCI-Express signal using the protocol, and for transmitting the PCI-Express signal to a host computer.

The SATA host bus adapter using a optical signal may further include a connection control unit for controlling connection of the first conversion unit with the second conversion unit, based on the optical signal that includes one or more of a control signal, a data write signal, and a data read signal.

The connection control unit may control connection of the host computer and the SATA storage by repeatedly transmitting the control signal.

The optical signal conversion unit may transmit the optical signal to the second conversion unit based on a residual buffer capacity of the first conversion unit, the residual buffer capacity being included in the control signal.

Also, a method for connecting SATA storage using a optical signal, according to an embodiment of the present invention, includes: converting, by a first conversion unit, a PCI-Express signal, transmitted from a host computer, into a data signal, using a protocol defined in a bus; by a optical signal conversion unit, converting the data signal into a optical signal, and transmitting the optical signal to a optical signal reception unit; and by a second conversion unit, converting the optical signal, received by the optical signal reception unit, into the data signal, converting the data signal into a SATA signal, using the protocol, and transmitting the SATA signal to SATA storage.

The protocol may be a protocol that accommodates both the PCI-Express signal and the SATA signal.

Converting the optical signal is configured to control connection of the first conversion unit and the second conversion unit based on the optical signal.

Converting the optical signal may comprise controlling data exchange between the first conversion unit and the second conversion unit based on the optical signal.

The control signal may include a link number, a lane number, whether a link is connected, whether a lane is connected, a residual buffer capacity of the first conversion unit, and a residual buffer capacity of the second conversion unit.

Controlling the data exchange is configured to control connection of the host computer and the SATA storage by repeatedly transmitting the control signal.

Converting the optical signal is configured to transmit the optical signal to the second conversion unit based on the residual buffer capacity of the second conversion unit.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
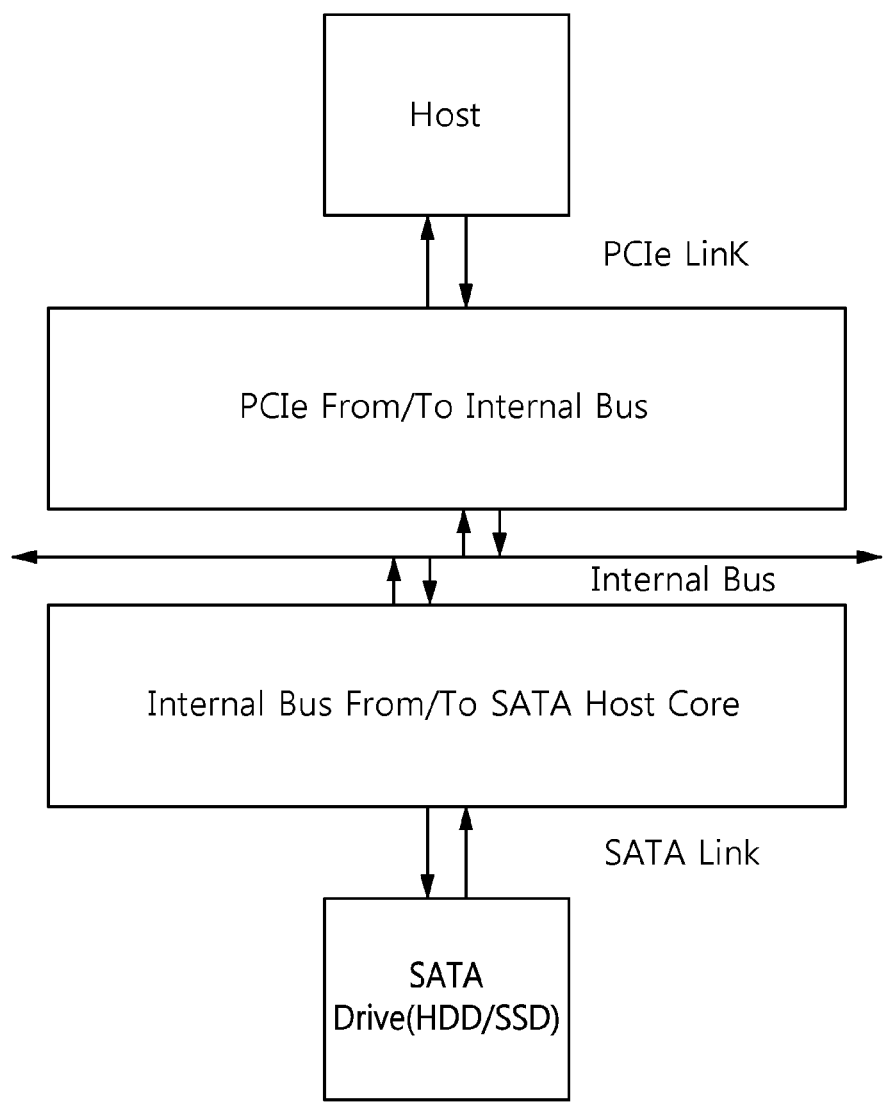
FIG. 1 illustrates a method for connecting Serial ATA (SATA) storage and a host computer.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, a preferred embodiment according to the present invention will be described in detail with reference to the accompanying drawings.

FIG. 1 illustrates a method for connecting Serial ATA (SATA) storage and a host computer.

Referring to FIG. 1, a conventional method for connecting SATA storage and a host computer is described.

A host computer may be connected to peripheral devices using a PCI Express (PCI-e) method. SATA storage may be connected to peripheral devices using a SATA protocol. Accordingly, in order to connect the host computer and the SATA storage, it is required to define an internal parallel bus protocol that may accommodate a common protocol between PCI-e and SATA.

Here, the host computer and SATA storage may be connected using a block for reciprocal conversion between a PCI-e link and an internal bus protocol and using a block for reciprocal conversion between the internal bus protocol and a SATA link.

In this case, because the PCI-e link is an electrical signal, the distance is short. Therefore, this link may not be used in data centers, in which large servers are primarily used. To solve this problem, SATA storage and a host computer are connected by applying an optical extension, and this method is described with reference to FIG. 2.

Figure 2:
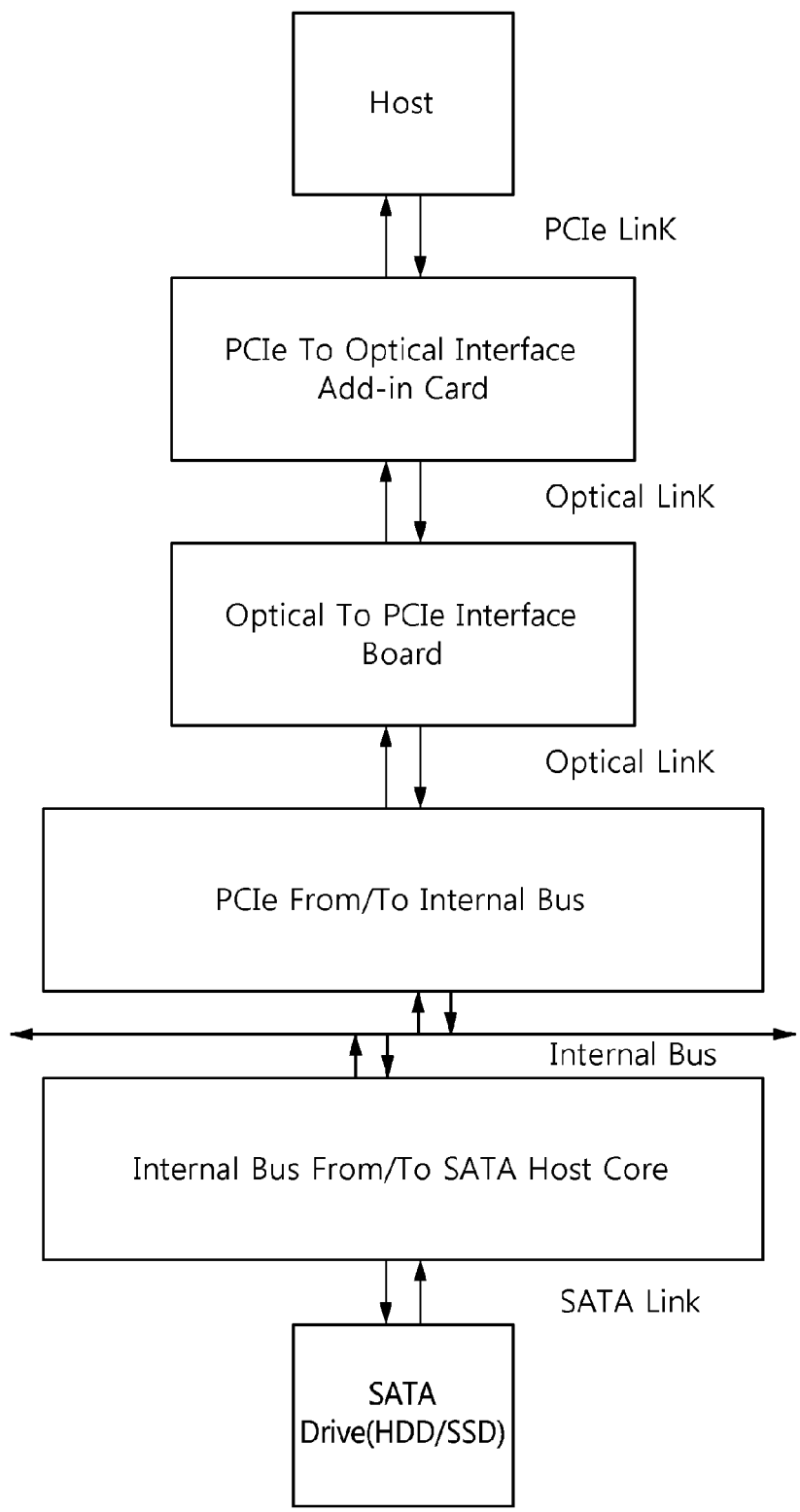
FIG. 2 illustrates a method for connecting SATA storage and a host computer by applying an optical extension to a Peripheral Component Interconnect Express (PCI-e) link.

FIG. 2 illustrates a method for connecting SATA storage and a host computer by applying an optical extension to a PCI-e link.

A method for connecting a host computer and SATA storage by applying an optical extension will be described with reference to FIG. 2.

A PCI-e signal transmitted from a host computer is converted into a optical signal using a PCI-e to Optical Interface Add-in card, and the optical signal is converted into the PCI-e signal using an Optical to PCI-e Interface board. Then, data is exchanged with the SATA storage using the method illustrated in FIG. 1.

Because the optical signal may be delivered without serious loss, it is widely used to connect host computers with storage in data centers using large servers.

Meanwhile, both the PCI-e to Optical Interface Add-in card and the Optical to PCI-e Interface board must accommodate the protocol required in the PCI-e link. In other words, because it is necessary to accommodate the protocol for accepting complex PCI-e signals, complexity is increased and costs are also increased.

In this case, the PCI-e to Optical Interface Add-in card and the Optical to PCI-e Interface board may use an expensive PCI-e switch chip to accept the PCI-e signals. However, when the PCI-e switch chip is used, several phases are required for data replication, thus causing latency in data transmission and reception. Also, the PCI-e signal has a transmission bandwidth of 2.5/5/8 Gbps, whereas a general optical interface has a 10 Gbps bandwidth. Accordingly, the bandwidth of the optical interface is not fully used, and is thus wasted. Therefore, the present invention converts the PCI-e signal to a first signal using a protocol defined in an internal bus; converts the first signal into a optical signal and transmits the optical signal; converts the received optical signal into a second signal using a protocol defined in a second internal bus; and converts the second signal into a SATA signal. Consequently, this method may connect the host computer and SATA storage by converting the complex PCI-e signal only once. The detailed description will be described with reference to FIG. 3.

Figure 3:
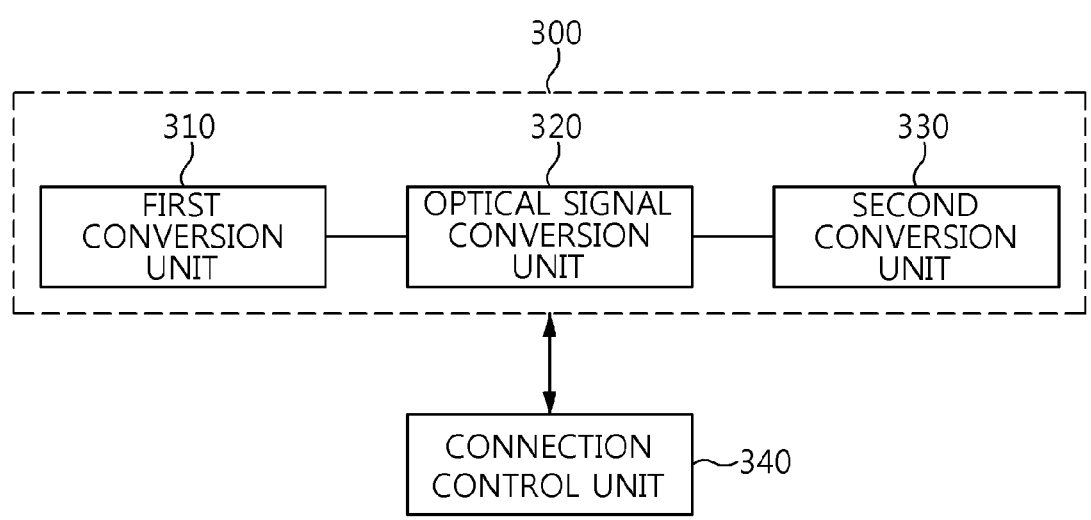
FIG. 3 is a block diagram illustrating a SATA host bus adapter using a optical signal according to an embodiment of the present invention.

FIG. 3 is a block diagram illustrating a SATA host bus adapter using a optical signal according to an embodiment of the present invention.

Referring to FIG. 3, a SATA host bus adapter using a optical signal according to an embodiment of the present invention comprises a first conversion unit 310, a optical signal conversion unit 320, and a second conversion unit 330, and may further comprise a connection control unit 340.

The first conversion unit 310 converts a PCI-e signal, transmitted from a host computer, to a data signal, using a protocol defined in a bus.

In this case, the first conversion unit 310 may convert a PCI-e signal into a data signal using a PCI-e core.

The PCI-e core may be provided by a Field Programmable Gate Array (FPGA) or an Application Specific Integrated Circuit (ASIC).

The data signal may be a signal that is transmitted inside a bus. The bus means a path for transmitting data between several devices or registers.

The first conversion unit 310 may be inserted in the PCI-e to Optical Interface Add-in card.

The protocol defined in the internal bus is a protocol that may accommodate both a PCI-e signal and a SATA signal. The protocol used in the present invention will be described later with reference to FIGS. 7 to 13.

The optical signal conversion unit 320 converts a data signal into a optical signal, and transmits the optical signal to a optical signal reception unit.

In this case, a method for converting a data signal into a optical signal is not limited. For example, the conversion may be performed using an existing Fibre Channel.

The optical signal conversion unit 320 may include a connection control unit, which controls the connection between the first conversion unit 310 and the second conversion unit 330 based on the optical signal.

In this case, the connection control unit may control data exchange between the first conversion unit 310 and the second conversion unit 330 based on a optical signal that includes one or more of a control signal, a data write signal, and a data read signal.

Here, the control signal may include a link number, a lane number, whether a link is connected, whether a lane is connected, the residual buffer capacity of the first conversion unit 310, and the residual buffer capacity of the second conversion unit 330. The description of the control signal will be made later with reference to FIGS. 7 to 13.

The connection control unit may repeatedly transmit the control signal to the first conversion unit 310 and the second conversion unit 330, and may control the connection between a host computer and SATA storage by repeatedly checking the residual buffer capacity.

In this case, the residual buffer capacity is checked because data is transmitted only when the residual buffer capacity is greater than the size of the data.

The second conversion unit 330 converts the optical signal, received by the optical signal reception unit, into a data signal, converts the data signal into a SATA signal using the protocol, and transmits the SATA signal to the SATA storage.

The protocol defined in the internal bus is a protocol that may accommodate both a PCI-e signal and a SATA signal. The protocol used in the present invention will be described later with reference to FIGS. 7 to 13.

The method for converting the optical signal into a data signal is not limited. For example, the conversion may be performed using an existing Fibre Channel.

Hitherto, the case in which data is transmitted from a host computer to SATA storage has been described with reference to FIG. 3, but the same operations are performed for the case in which data is transmitted from SATA storage to a host computer.

For example, a SATA signal, transmitted from the SATA storage, is converted into a data signal using a protocol; the data signal is converted into a optical signal; the optical signal is transmitted to the optical signal reception unit; the optical signal, received by the optical signal reception unit, is converted into the data signal; the data signal is converted into a PCI-e signal using the protocol; and the PCI-e signal is transmitted to the host computer.

Figure 4:
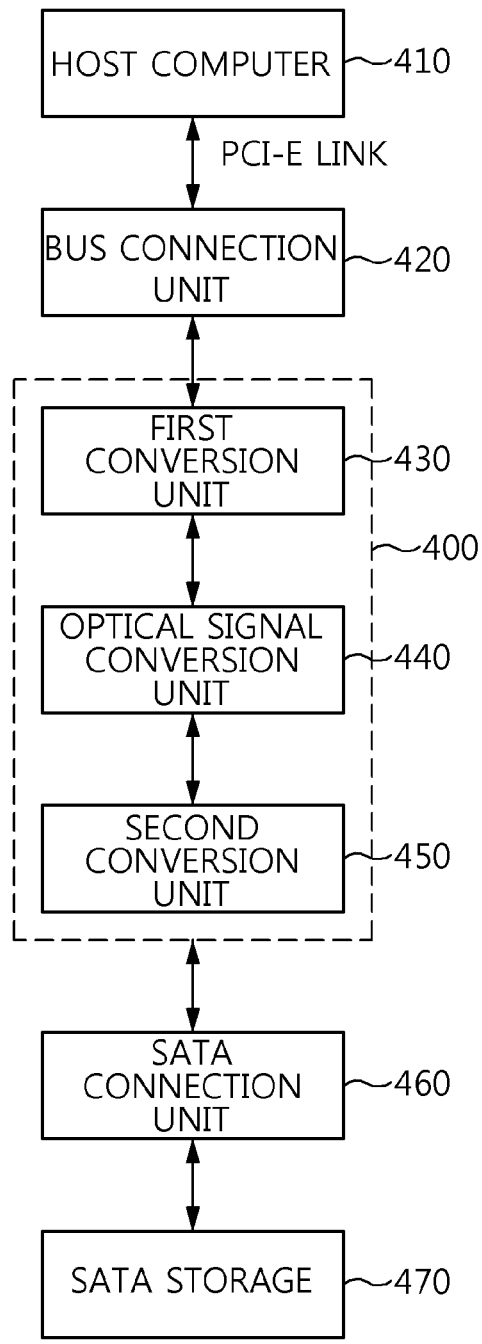
FIG. 4 illustrates the connection of SATA storage and a host computer using a SATA host bus adapter that uses a optical signal, according to an embodiment of the present invention.

FIG. 4 illustrates the connection of SATA storage and a host computer using a SATA host bus adapter that uses a optical signal, according to an embodiment of the present invention.

Referring to FIG. 4, a SATA host bus adapter 400, a host computer 410, a bus connection unit 420, a SATA connection unit 460, and SATA storage 470 are illustrated, and the SATA host bus adapter 400 comprises a first conversion unit 430, a optical signal conversion unit 440, and a second conversion unit 450.

The host computer 400 may mean a computer that performs data processing in an information processing system. In FIG. 4, the host computer 400 is connected to a single SATA storage device 470. In other words, a single SATA storage device 470 is illustrated for convenience of description, but the host computer 400 may be connected to multiple SATA storage devices.

The bus connection unit 420 receives a PCI-e signal, configured by a PCI-e protocol, from the host computer 400, and transmits the PCI-e signal, configured by the PCI-e protocol, to the first conversion unit 430.

The first conversion unit 430 converts the PCI-e signal into a data signal, using a protocol defined in an internal bus, and transmits the data signal to the optical signal conversion unit 440.

The optical signal conversion unit 440 converts the received data signal into a optical signal, and transmits the optical signal to the second conversion unit 450.

In this case, the optical signal, converted by the optical signal conversion unit 440, includes one or more of a control signal, a data write signal, and a data read signal, and data exchange between the first conversion unit 430 and the second conversion unit 450 may be controlled based on the control signal included in the optical signal.

The second conversion unit 450 converts the received optical signal into a data signal and generates a SATA signal using a protocol identical to the protocol used in the optical signal conversion unit 440. Then, the second conversion unit 450 transmits the SATA signal to the SATA connection unit 460.

The SATA connection unit 460 transmits the received SATA signal to the SATA storage 470.

According to the description of FIG. 4, the SATA host bus adapter using a optical signal, according to an embodiment of the present invention, converts a PCI-e signal into a optical signal using a protocol, and connects a host computer and SATA storage through a process for converting the optical signal into a SATA signal. In contrast, the conventional SATA host bus adapter using a optical signal, described in FIG. 2, converts a PCI-e signal to a optical signal, transmits it to the storage, converts the optical signal into a PCI-e signal, and converts the PCI-e signal into a SATA signal. In other words, because the present invention uses a protocol capable of accommodating both the SATA signal and PCI-e signal, it is possible to connect the host computer and the SATA storage without multiple conversions of the complicated PCI-e signal.

Figure 5:
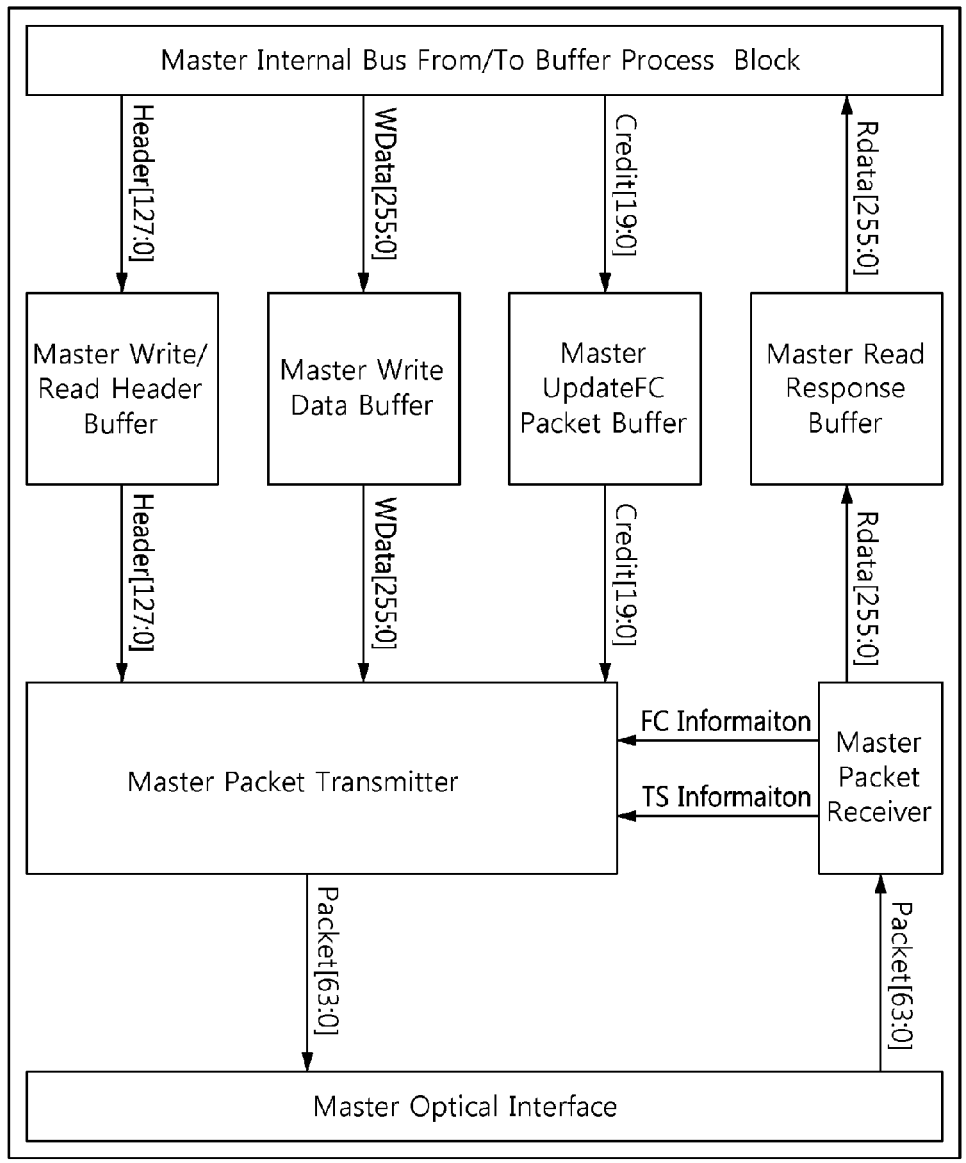
FIG. 5 illustrates the conversion of a PCI-e signal into a optical signal in a SATA host bus adapter using a optical signal, according to an embodiment of the present invention.

FIG. 5 illustrates the conversion of a PCI-e signal into a optical signal in a SATA host bus adapter using a optical signal, according to an embodiment of the present invention. More specifically, FIG. 5 illustrates another embodiment of the first conversion unit 310 and the optical signal conversion unit 320.

When a first signal, converted from the PCI-e signal, is received, the first signal is converted into a optical signal, using a protocol, in a Master Internal Bus from/to Buffer Process Block, a Master Write/Read Head Buffer, a Master Write Data Buffer, and a Master Update Flow Control Packet Buffer. Then, the optical signal is transmitted to the second conversion unit 330 using a Master Packet Transmitter and a Master Optical Interface.

When the second conversion unit 330 receives the optical signal, the optical signal is received using the Master Optical Interface, and converted into a signal corresponding to the optical signal using the protocol. The signal is converted into a PCI-e signal using a Master Read Response Buffer and the Master Internal Bus from/to Buffer Process Block, and the PCI-e signal is transmitted to the host computer.

Figure 6:
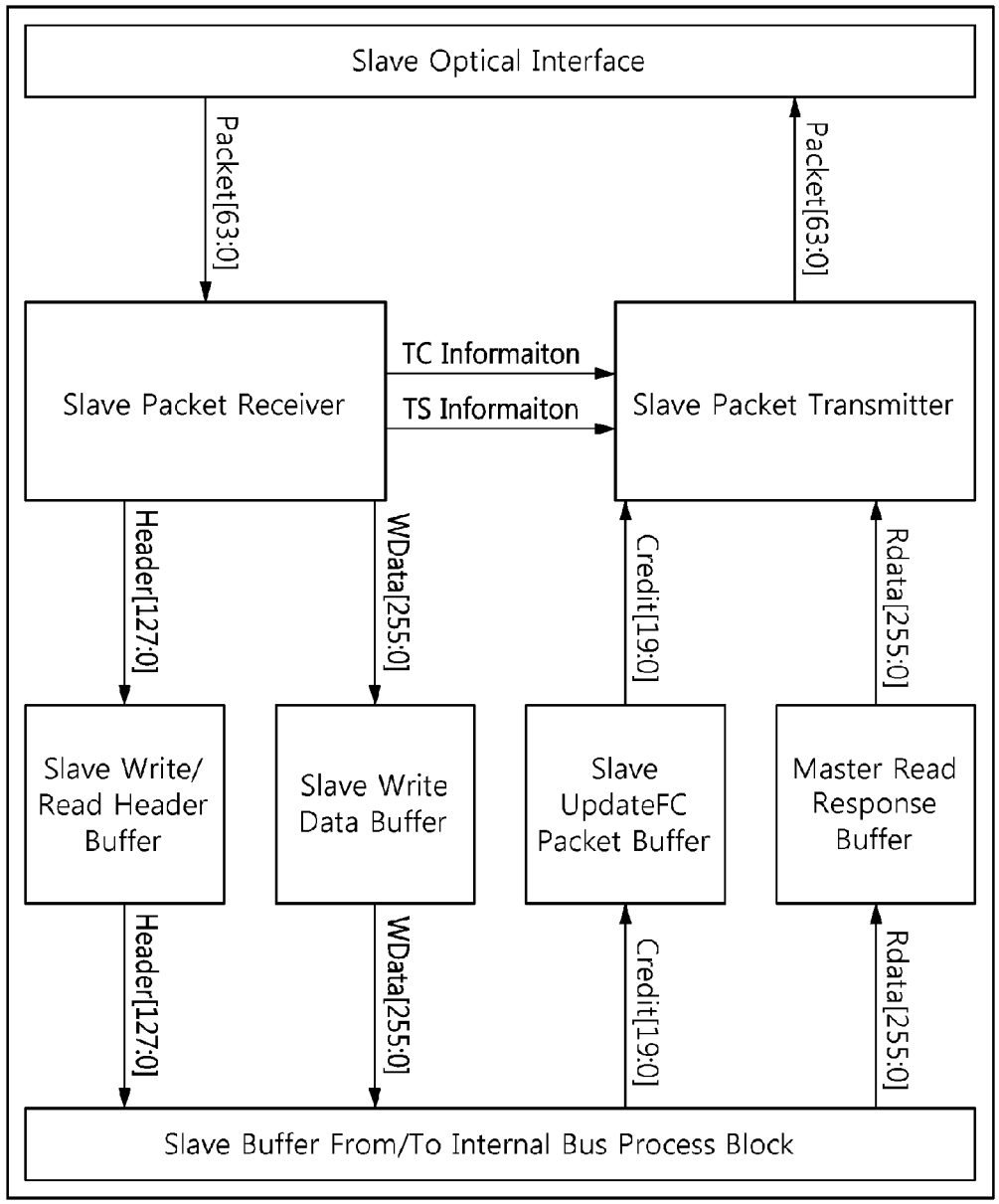
FIG. 6 illustrates the conversion of a optical signal into a SATA signal in a SATA host bus adapter using a optical signal, according to an embodiment of the present invention.

FIG. 6 illustrates the conversion of a optical signal into a SATA signal in a SATA host bus adapter using a optical signal, according to an embodiment of the present invention. That is, another embodiment of the second conversion unit 330 and the optical signal conversion unit 320 is illustrated.

Referring to FIG. 6, the optical signal, transmitted from the optical signal conversion unit 320, is received by a Slave Optical Interface, and is delivered to a Slave Packet Receiver.

The Slave Packet Receiver converts the optical signal into a signal corresponding to the optical signal using the protocol; converts the signal into a SATA signal corresponding to the optical signal using a Slave Write/Read Header Buffer, a Slave Write Data Buffer, and a Slave Buffer from/to Internal Bus Process Block; and transmits the SATA signal to the SATA storage.

When the SATA storage transmits a SATA signal, the SATA signal is converted into a signal corresponding to the protocol using the Slave Buffer from/to Internal Bus Process Block, a Slave Update Flow Control Packet Buffer, and a Slave Read Response Buffer, the signal corresponding to the protocol is delivered to a Slave Optical Interface using a Slave Packet Transmitter, and the signal is converted into a optical signal and transmitted to the first conversion unit 310.

FIGS. 7 to 13 illustrate a protocol used by a SATA host bus adapter using a optical signal, according to an embodiment of the present invention.

Figure 12:
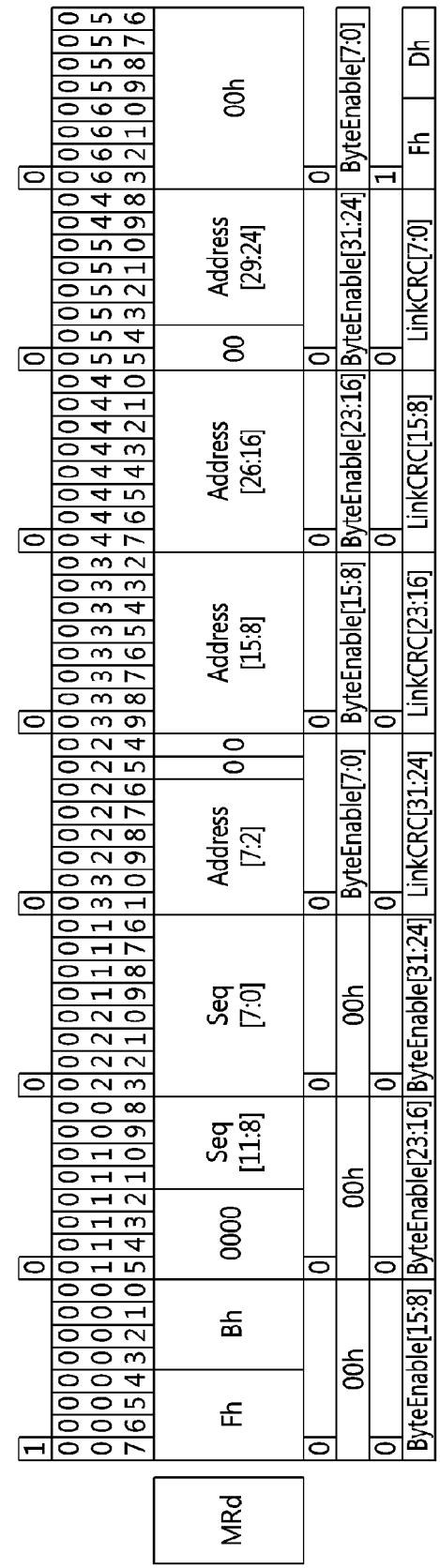
Figure 13:
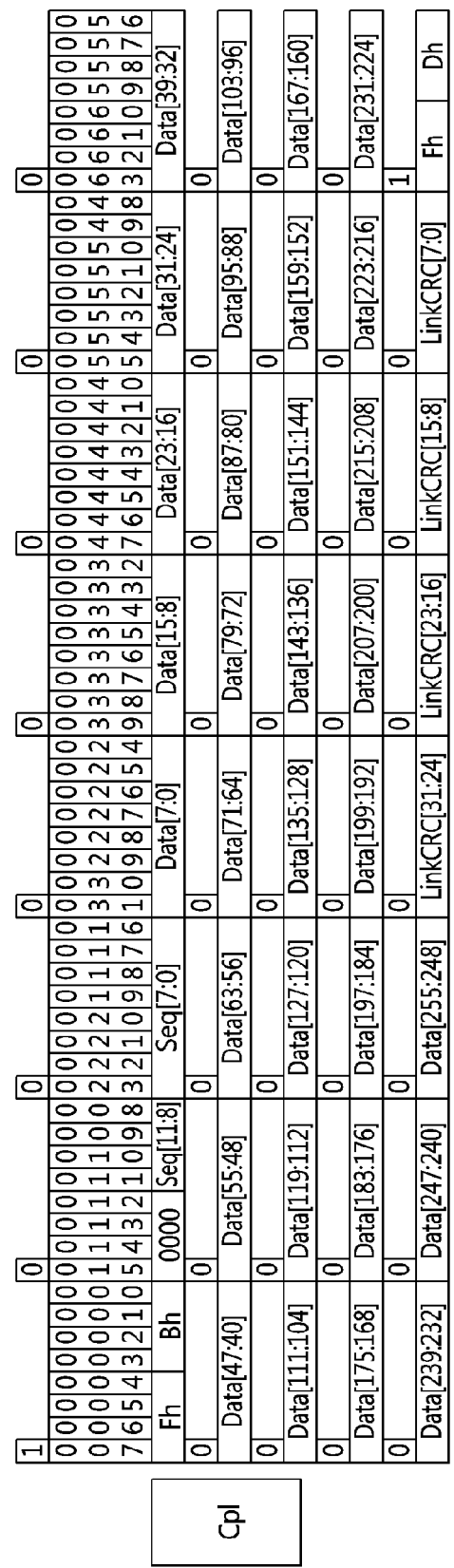

The protocol used by the SATA host bus adapter using a optical signal defines a packet structure used in a process for initial establishment of an optical link (FIG. 7), a flow control initialization packet structure including the residual buffer capacity (FIG. 8), a data write packet structure for writing data in SATA storage (FIG. 9), a response control packet structure for indicating whether the data write packet has been received (FIG. 10), a flow control update packet including the change in the residual buffer capacity (FIG. 11), a data read packet structure for reading the data stored in the SATA storage (FIG. 12), and a data read response packet structure for indicating whether the data read packet has been received (FIG. 13).

Figure 7:
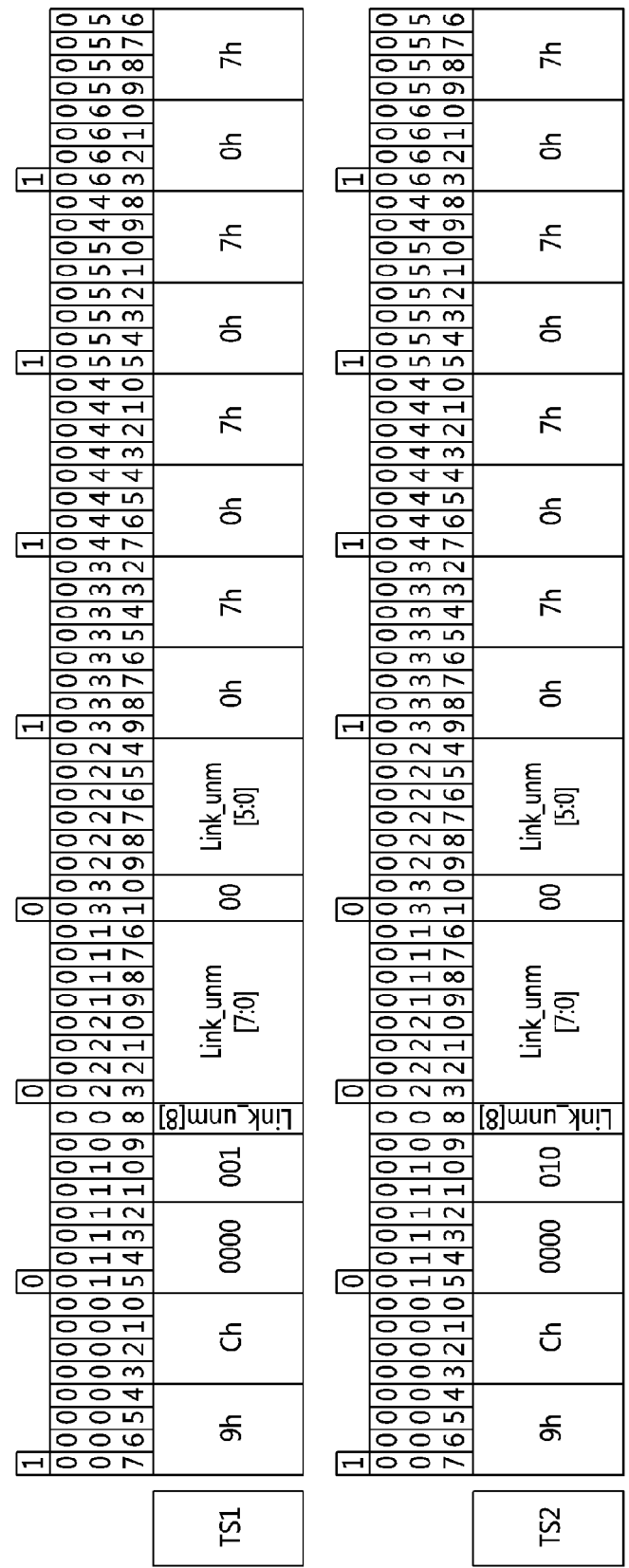
FIGS. 7 to 13 illustrate a protocol used by a SATA host bus adapter using a optical signal, according to an embodiment of the present invention.

FIG. 7 illustrates a packet structure used in an initial process for establishing an optical link that connects the first conversion unit 310 and the second conversion unit 330.

Referring to FIG. 7, the packet used in the process for initial establishment of the optical link comprises a Training Sequence1 (TS1), and a TS2, wherein TS1 is a packet used in a process for initial establishment of an optical link and TS2 is a packet used in a process for confirming the link establishment.

A high-speed link, used in the process for initial establishment of the optical link, forms the optical link based on 10 GBase-R, and transmits data in units of 64 bits. Here, each byte of the transmitted data is defined as a control symbol for packet framing or a data symbol.

The packet used in the process for initial establishment of the optical link is started with a control symbol 0x9C, 3 bytes follow the control symbol, and another control symbol 0x07 is repeated in the following 4 bytes. This format is suitable for a specification for 64-bit transmission in 10 GBase-R. Also, this format is a structure for complying with the 10 GBase-R specification. If another high-speed serial communication specification is used, the packet format may be changed according to the specification. Because the present invention is not limited as to the high-speed serial communication specification, the packet format proposed in FIG. 7 is just an embodiment, and the format is not limited to this.

In FIG. 7, bits comprise 8-bit symbols, and the packet structure is illustrated as bits 7 to 0, 15 to 8, 23 to 16, 31 to 24, 39 to 32, 47 to 40, 55 to 48, and 63 to 56, according to the order to be transmitted. This format is commonly applied to FIGS. 8 to 13.

In this case, the digit expressed above the bit number is an identifier that indicates a control symbol or a data symbol. When data is structured in byte units, the data is effectively structured in 9-bit units due to the addition of the identifier. Accordingly, if the most significant bit is 0, this represents that the data is a data symbol, whereas if the most significant bit is 1, this represents that the data is a control symbol.

Bits 7 to 0 are defined as a control symbol. Here, the control signal is 1 and the data bits are 0x9C.

Bits 15 to 8 are defined as a data symbol. In this case, bits 15 to 12 are an identifier indicating that the corresponding packet is a TS packet or another type of packet.

When bits 15 to 12 are 0000, it may mean that the packet is a TS packet.

When the value of bits 11 to 9, included in bits 15 to 8, is defined as 001, the packet is a TS1. In this case, bits 15 to 12 must also be defined as 0000.

When the value of bits 11 to 9 is 010, it means that the packet is a TS2.

Bit 8 is the most significant bit of a link number that comprises 9 bits. When bit 8 is 1, it indicates that the process corresponds to a link search phase, and thus the remaining 8 bits of the link number are not valid. Conversely, when bit 8 is 0, it indicates that the process corresponds to a link establishment phase, and thus the remaining 8 bits are valid.

Bits 23 to 16 are defined as a data symbol, and represent a link number. The present invention exemplifies the case in which a single link is included, but when several optical links are connected, the links must be identified. Because the link number comprises 8 bits, a maximum of 256 links may be formed.

Bits 31 to 24 are defined as a data symbol, and bits 31 to 30 are not used, and are fixed to 0. Bits 29 to 24 represent a lane number. The present invention does not use a multi-lane link and has one lane, but the 6 bits are reserved for further use in a multi-lane configuration.

When bit 24, which is the most significant bit of bits 31 to 24, is 1, because the process corresponds to a lane search phase, the remaining 5 bits of the lane number are not valid. When bit 24 is 0, because the process corresponds to a lane establishment phase, the remaining 5 bits are valid. Through the 5 bits, a maximum of 32 lanes may be formed.

Bits 39 to 32, 47 to 40, 55 to 48, and 63 to 56 are control symbols. Here, because the control signal is 1 and the data bits are 0×07, it indicates an IDLE symbol.

The method for establishing an optical link using the TS1 packet and the TS2 packet, illustrated in FIG. 7, is described.

First, in an initial state, a Master Packet Transmitter of an Internal Bus from/to Optical Protocol Engine repeatedly transmits a TS1 in which the link number [8] (link_num[8]) and the lane number [5] (lane_num[5]) are set to 1.

Next, a Slave Packet Receiver detects that the Master Packet Transmitter starts to operate, by receiving the TS1 in which the link number [8] and the lane number [5] are both set to 1.

Next, the Slave Packet Receiver may inform the Slave Packet Transmitter that the Slave Packet Receiver detects the operation of the Master Packet Transmitter, using a TS Information signal.

Next, the Slave Packet Transmitter, having been informed that the Master Packet Transmitter has started to operate, repeatedly transmits a TS2 in which the link number [8] and the lane number [5] are respectively set to 1, whereby a Master Packet Receiver receives the TS2 and recognizes that the Slave Packet Transmitter detects the operation of the Master Packet Transmitter.

In this case, the Master Packet Receiver, having received the TS2 of which the link number [8] and the lane number [5] are 1, informs the Master Packet Transmitter of the reception of the TS2.

The Master Packet Transmitter, having confirmed the reception of the TS2, repeatedly transmits the TS1 in which the link number [8] is changed to 0 and the value of the link number [7:0] is set.

The Slave Packet Receiver receives the TS1 in which the link number [8] is 0 and the value of the link number [7:0] is set, and informs the Slave Packet Transmitter of the reception of the TS1.

The Slave Packet Transmitter, having been informed that the Slave Packet Receiver has received the TS1 in which the link number [8] is 0 and the value of the link number [7:0] is set, may transmit a TS1 in which the link number [8] is changed to 0 and the link number [7:0] is changed to the link number [7:0] in the TS1 received by the Slave Packet Receiver.

The Master Packet Receiver, having received the TS1 in which the link number [8] is 0 and the link number [7:0] is the same as that in the TS1 transmitted by the Master Packet Transmitter, informs the Master Packet Transmitter of the reception of the TS1.

In this case, the Master Packet Transmitter, having confirmed the reception of the TS1 in which the link number [7:0] is changed to its link number [7:0], transmits the TS1 in which the lane number [5] is 0 and the value of lane number [4:0] is set.

The Slave Packet Receiver, having received the TS1 in which the link number [8] is 0, the link number [7:0] is identical to that in the TS1 transmitted by the Slave Packet Transmitter, the lane number [5] is 0, and the value of lane number [4:0] is set, informs the Slave Packet Transmitter of the reception of the TS1.

The Slave Packet Transmitter, having been informed that the Slave Packet Receiver received the TS1 in which the link number [8] is 0, the link number [7:0] is identical to that in the TS1 transmitted by the Slave Packet Transmitter, the lane number [5] is 0, and the value of lane number [4:0] is set, transmits the TS1 in which the lane number [5] is changed to 0 and the lane number [4:0] is changed to the lane number [4:0] in the TS1 received by the Slave Packet Receiver.

The Master Packet Receiver, having received the TS1 in which the link number [8] is 0, the link number [7:0] is identical to that in the TS1 transmitted by the Master Packet Transmitter, the lane number [5] is 0, and the lane number [4:0] is identical to that in the TS1 transmitted by the Master Packet Transmitter, informs the Master Packet Transmitter of the reception of the TS1.

The Master Packet Transmitter, having confirmed the reception of the TS1 in which the link number [8] is 0, the link number [7:0] is the same as that in the TS1 transmitted by itself, the lane number [5] is 0, and the lane number [4:0] is the same as that in the TS1 transmitted by itself, may transmit a TS2 having a link number [8:0] and a lane number [5:0] identical to those transmitted through the TS1.

In this case, the Master Packet Receiver and the Slave Packet Receiver receive the TS2, and may respectively inform the Master Packet Transmitter and the Slave Packet Transmitter of the reception of the TS2.

In this case, the Master Packet Transmitter and Slave Packet Transmitter, which are informed that more than a certain number of TS2 (for example, 8 TS2s) have been received, transmit more than a certain number of TS2 (for example, 16 TS2s), and then stop the transmission of the TS2, whereby a physical link establishment process for setting a link number and a lane number is completed.

Figure 8:
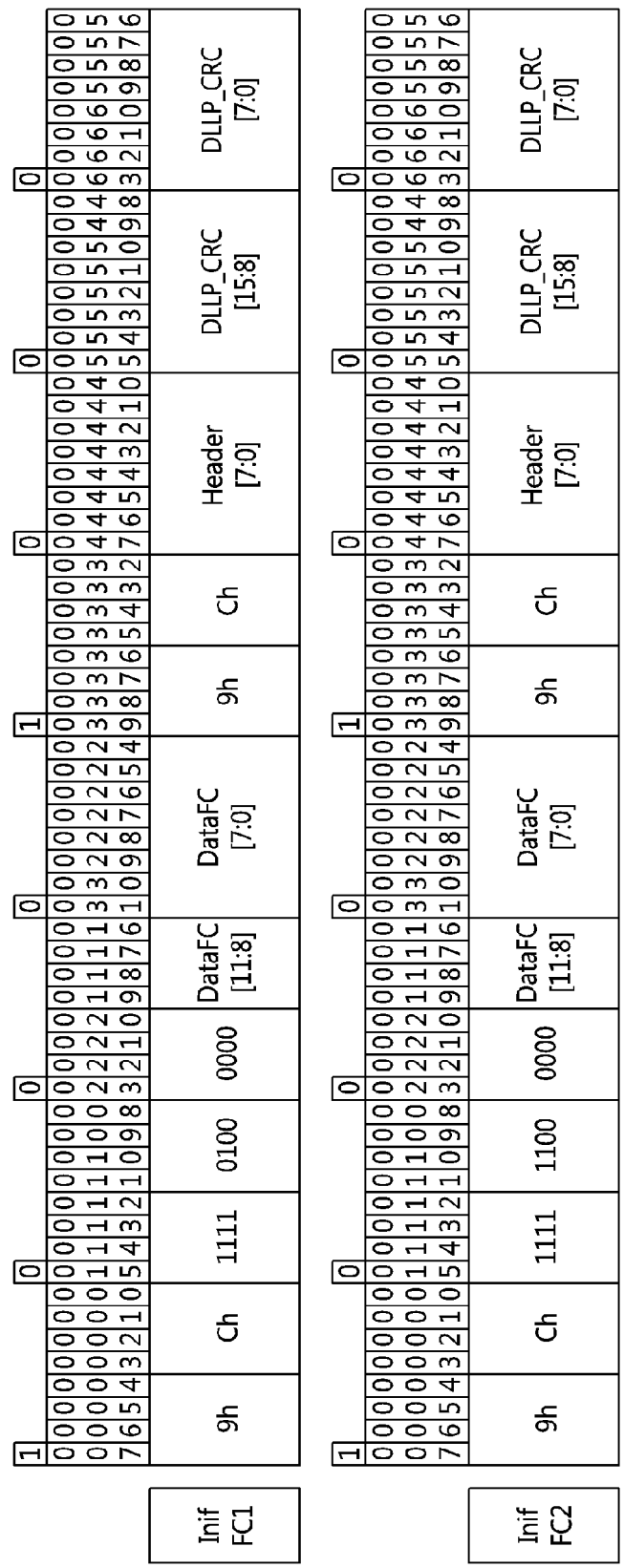

FIG. 8 illustrates a flow control initialization packet structure that configures a protocol used by a SATA bus adapter using a optical signal, according to an embodiment of the present invention.

First, a flow control initialization packet may indicate a packet used for transmitting the residual buffer capacity to enable a transmitter to transmit data only when the residual buffer capacity of the receiver is sufficient to receive the packet. For example, when the second conversion unit 330 transmits the residual buffer capacity of the second conversion unit, using the flow control initialization packet, the first conversion unit 310, which receives the flow control initialization packet, may determine whether to transmit data by comparing the size of the data to be transmitted with the residual buffer capacity of the second conversion unit.

The flow control initialization packet structure is described with reference to FIG. 8.

In the flow control initialization packet, bits 7 to 0 are defined as a control symbol, and the control signal is 1 and the data bits are 0×9C.

Bits 15 to 8 are defined as a data symbol. Also, bits 15 to 12, included in bits 15 to 8, are 1111, which may indicate that the packet is for safe data transmission and reception.

When bits 11 to 8 are 0100, it may represent that the packet is a flow control initialization packet 1 (InitFC1).

When bits 11 to 8 are 1100, it may represent that the packet is a flow control initialization packet 2 (InitFC2).

Bits 23 to 16 are defined as a data symbol, and bits 23 to 20 are fixed to 0000. Also, bits 19 to 16 are more significant 4 bits of DataFC[11:0], which indicates the data buffer size when the packet is a flow control packet.

In this case, bits 31 to 24 are defined as a data symbol, and represent less significant 8 bits of DataFC[11:0], which indicates the data buffer size when the packet is a flow control packet.

Bits 39 to 32 are defined as a control symbol, and the control signal is 1 and the data bits are 0×9C.

Bits 47 to 40 are defined as a data symbol, and indicate the header buffer size.

Bits 55 to 48 and 63 to 56 are data symbols, and indicate the Cyclic Redundancy Check (CRC) for a total of 48 bits corresponding to the data symbols of the flow control packet. The CRC may be used to verify the integrity of the packet.

The flow control initialization packet is repeatedly transmitted. In other words, even if an error occurs in a packet, because the same packet follows the packet, it is not necessary to indicate the arrival of the packet including the error.

A method for controlling packet flow based on the residual buffer capacity, using the flow control initialization packet of FIG. 8, is described.

First, a Master Packet Transmitter and a Slave Packet Transmitter transmit an InitFC1 packet including the data buffer size and the header buffer size of the Master Packet Transmitter and the Slave Packet Transmitter.

Also, a Master Packet Receiver and a Slave Packet Receiver, which received the InitFC1 packet, write the buffer size of the opposite side, and inform the opposite side of the reception of the InitFC1 packet by enabling the transmitters to transmit an InitFC2 packet.

Also, the Master Packet Receiver and the Slave Packet Receiver, which received the InitFC2 packet, respectively inform the Master Packet Transmitter and the Slave Packet Transmitter that the flow control initialization is completed because they confirmed that the InitFC1 packet transmitted by the transmitters has been received by the opposite side, whereby the Master Packet Transmitter and the Slave Packet Transmitter become capable of transmitting data packets.

Figure 9:
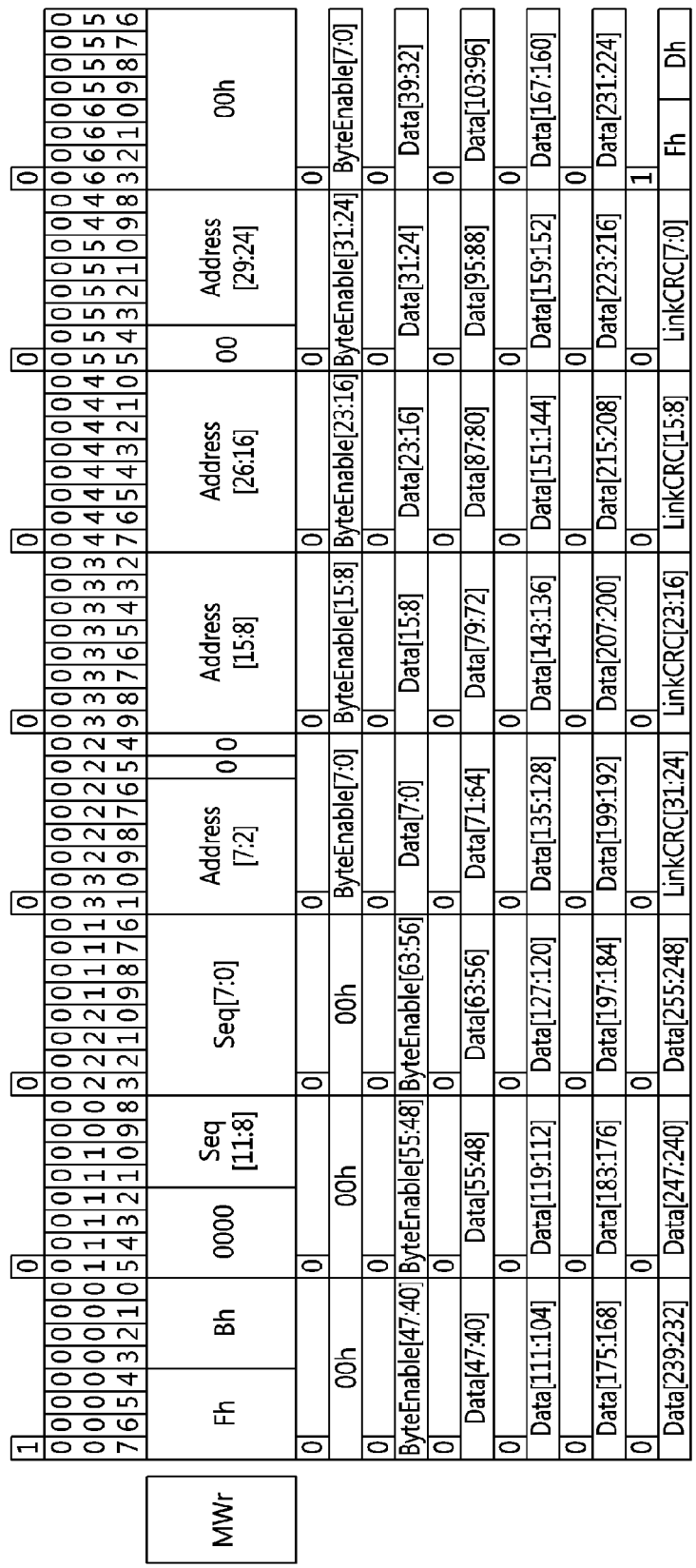

FIG. 9 illustrates a data write packet structure that configures a protocol used by a SATA bus adapter using a optical signal, according to an embodiment of the present invention.

First, "writing data" means that the data is processed in a host bus and stored in SATA storage.

For the data writing operation, the first conversion unit 310 may transmit an address signal, a write strobe signal, a byte enable signal, and a write data signal.

The data write packet may comprise a 128-bit header and 256 bits of data, the header including an address, a write identifier, and byte enable information.

The optical signal conversion unit 320 converts the data write packet into a optical signal, and may output the optical signal.

The data write packet is separated into 64-bit units according to the sequence.

Bits 7 to 0, defined as a control symbol, are 0×FB, representing the start of a data read/write packet.

Bits 15 to 8 are defined as a data symbol, and the more significant bits 15 to 12 are not used, and are fixed to 0. The less significant bits 11 to 8 correspond to the more significant 4 bits of Seq[11:0], which indicates the sequence of the data read/write packet.

Bits 23 to 16 are defined as a data symbol, and correspond to the less significant 8 bits of Seq[11:0], which indicates the sequence of the data read/write packet.

Bits 31 to 24 are defined as a data symbol, and bits 31 to 26 represent Address[7:2] of a double-word address (32-bit word). Bit 25 is fixed to 0, and is not used. Bit 24 is 1, which indicates that the packet is a data write packet. Bits 39 to 32 are defined as a data symbol and correspond to Address[15:8].

Bits 47 to 40 are defined as a data symbol and represent Address[23:16].

Bits 55 to 48 are defined as a data symbol, and bits 55 to 54 are fixed to 0 and are not used. Bits 53 to 48 represent Address[29:24].

Bits 63 to 56 are defined as a data symbol, but they are not used, and are fixed to 0.

The next 64 bits start with 3 data symbols which are not used, the 3 data symbols being 3 bytes.

The 64 bits of information that contains 8 bytes of byte enable information follows the unused data symbols. After the byte enable information, a 32-byte data payload (256 bits) is allocated, and a 32-bit LCRC, which is the CRC of the data, follows the data payload. Finally, a control symbol, 0×FD, which represents the end of the packet, follows the LCRC.

In this case, because Address[29:2] is valid and corresponds to a double word unit, Address[29:2] may express an address for 1 GB address space. When it is required to extend the address space, it is possible to allocate bits from among the unused data symbols.

Figure 10:
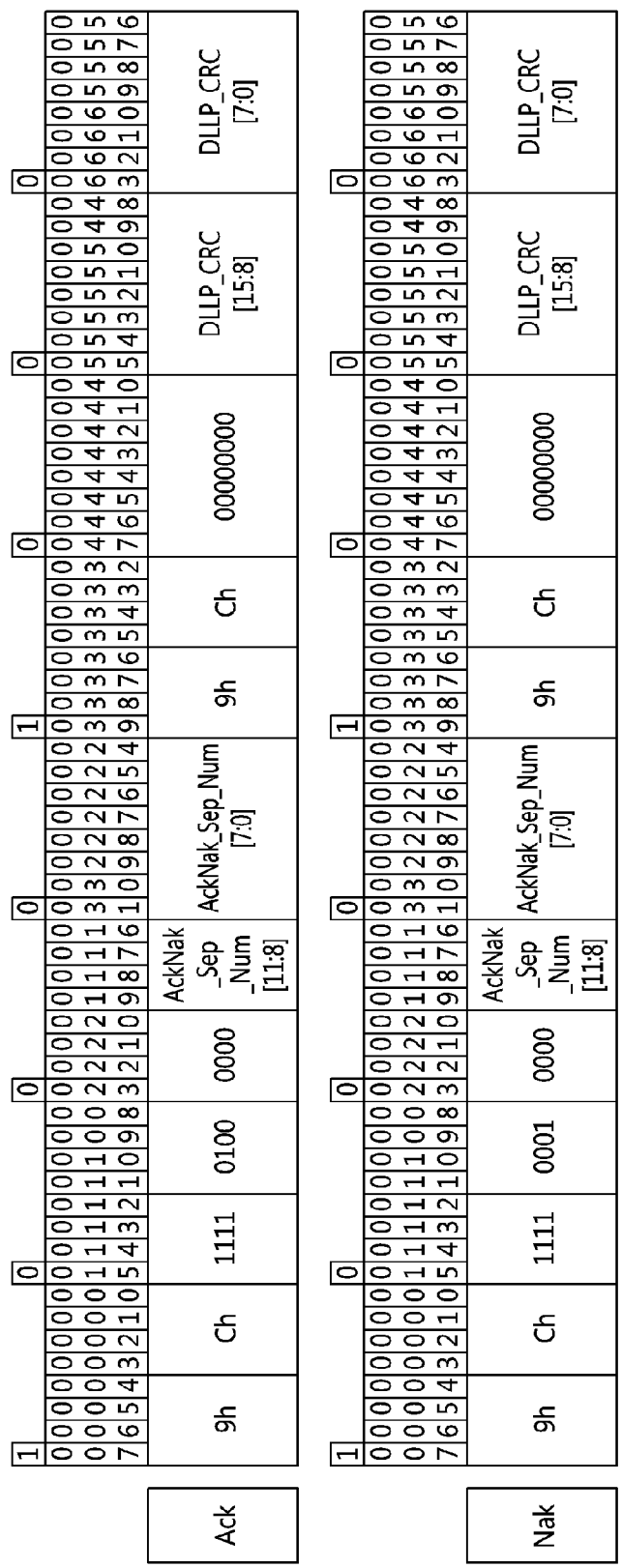

FIG. 10 illustrates a response control packet configuring a protocol used by a SATA bus adapter using a optical signal, according to an embodiment of the present invention.

The response control packet means a packet used for indicating the reception of a data write packet after the data write packet is received. For example, when the second conversion unit transmits a data write packet and the first conversion unit receives the packet, the first conversion unit transmits a response control packet.

Bits 7 to 0 of the response control packet are defined as a control symbol, and the control signal is 1 and the data bits are 0×9C.

Bits 15 to 8 are defined as a data symbol, and bits 15 to 12 are 1111, which indicate that the packet is a packet for safe data transmission and reception. When bits 11 to 8 are 0000, the packet is an Ack packet for indicating that the sequence and LRC of the received packet are correct. Conversely, when bits 11 to 8 are 0001, the packet is a Nak packet for representing the reception of a packet in which the sequence is not correct, the LCRC is not correct, or neither of them are correct.

Bits 23 to 16 are defined as a data symbol, and bits 23 to 20 are fixed to 0000. Bits 19 to 16 represent more significant 4 bits of AckNak_Seq_Num[11:0], which indicates the correct sequence when the packet is a response control packet.

Bits 31 to 24 are defined as a data symbol and represent less significant 8 bits of AckNak_Seq_Num[11:0], which indicates the correct sequence when the packet is a response control packet. When the packet is an Ack packet, AckNak_Seq_Num[11:0] contains the sequence of the currently received packet. When the packet is a Nak packet, AckNak_Seq_Num[11:0] contains the sequence of the last correct packet among the previously received packets.

Bits 39 to 32 are defined as a control symbol, and the control signal is 1 and the data bits are 0×9C. Bits 47 to 40, defined as a data symbol, indicate the header buffer size.

Bits 55 to 48 and 63 to 56 are defined as data symbols, and represent CRC for the 48-bit data symbol of the flow control packet, to secure the integrity of the packet.

When the response to a packet is Nak, the transmitter retransmits the packets that were transmitted after the packet the sequence of which corresponds to the value of AckNak_Seq_Num, included in the Nak packet. Also, when no response is received for a certain time, the transmitter retransmits all packets from the first packet for which Ack was not received to the last transmitted packet.

For example, when the second conversion unit transmits a data write packet and the first conversion unit receives the packet, the first conversion unit transmits a response control packet to the second conversion unit. In this case, if the response control packet is Nak, the second conversion unit retransmits the packets (data write packets) that were transmitted after the packet the sequence of which is the AckNak_Seq_Num included in the Nak packet.

Figure 11:
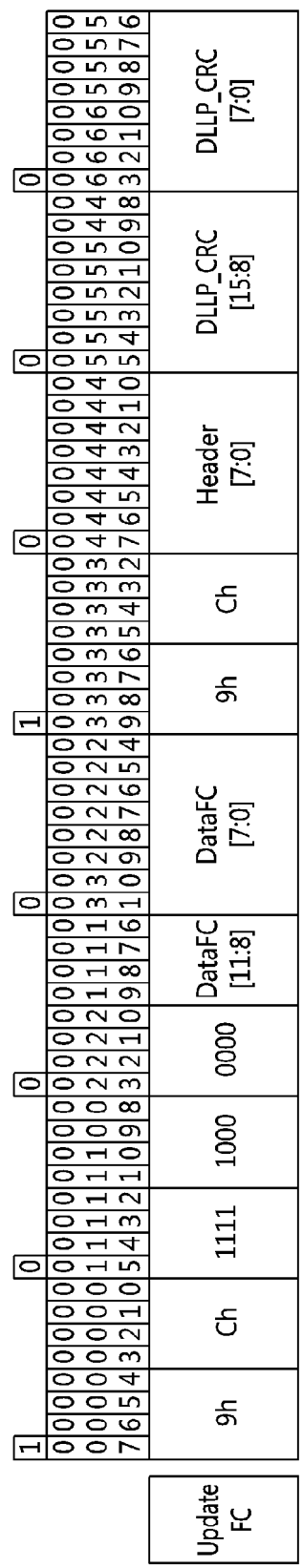

FIG. 11 illustrates a flow control update packet that configures a protocol used by a SATA bus adapter using a optical signal, according to an embodiment of the present invention.

First, the flow control update packet is a packet containing the change in the residual buffer capacity of the transmitter that transmits the flow control update packet.

The optical signal conversion unit 320 reads the data of a buffer, and transmits the change in the residual buffer capacity to the first conversion unit 310 or the second conversion unit 330 using a flow control update packet.

In the flow control update packet, bits 7 to 0 are defined as a control symbol, and the control signal is 1 and the data bits are 0×9C.

Bits 15 to 8 are defined as a data symbol. Also, bits 15 to 12, included in bits 15 to 8, are 1111, which may indicate that the packet is for safe data transmission and reception (namely, the packet is a flow control initialization packet or a flow control update packet).

When bits 11 to 8 are 1000, it means that the packet is a flow control update packet.

Bits 23 to 16 are defined as a data symbol, and bits 23 to 20 are fixed to 0000. Bits 19 to 16 represent more significant 4 bits of DataFC[11:0], which indicates the data buffer size when the packet is a flow control packet.

Bits 31 to 24 are defined as a data symbol, and represent less significant 8 bits of DataFC[11:0], indicating the data buffer size when the packet is a flow control packet.

Bits 39 to 32 are defined as a control symbol, and the control signal is 1 and the data bits are 0×9C.

Bits 47 to 40 are defined as a data symbol, and represent the header buffer size.

Bits 55 to 48 and 63 to 56 are data symbols and represent CRC for a total of 48 bits of data symbols of the flow control packet. The CRC may be used to verify the integrity of the packet.

FIG. 12 illustrates a data read packet structure configuring a protocol used by a SATA bus adapter using a optical signal, according to an embodiment of the present invention.

The data read packet structure may mean a packet structure that is transmitted to enable a host computer to read data stored in SATA storage.

With the exception that no data payload is included in the packet and bit 24 is 0, the data read packet structure is the same as the data write packet structure.

The process for reading data stored in the SATA storage using the data read packet is described with reference to FIG. 4.

When the second conversion unit 450 transmits a data read packet, the second conversion unit transmits a header and receives Ack. Then, the second conversion unit may access the next packet. In the case of a data read packet, the transmission of the next packet may be delayed until a data read response packet is received.

When the second conversion unit 450 transmits the data read packet, the second conversion unit 450 may store the data read packet in an internal buffer.

The second conversion unit 450 may convert the data stored in the internal buffer into a bus signal.

The SATA connection unit 460, which receives the internal bus signal, may transmit a read signal to the SATA storage 470 using the SATA link.

The SATA storage 470 delivers data corresponding to the data read signal to the SATA connection unit 460. The SATA connection unit 460 converts the data corresponding to the data read signal and delivers it to the second conversion unit 450 to be stored in the internal buffer of the second conversion unit 450.

The data stored in the internal buffer of the second conversion unit 450 is converted into a optical signal in the optical signal conversion unit 440, and is transmitted to a host computer 410 via the first conversion unit 430 and the bus connection unit 420.

Transmission from the second conversion unit 450 to the optical signal conversion unit 440 may be performed using a data read response packet, and the data read response packet is described in FIG. 13.

FIG. 13 illustrates a data read response packet that configures a protocol used by a SATA bus adapter using a optical signal, according to an embodiment of the present invention.

The data read response packet has a format in which data corresponding to an address and byte enable information are excluded from a data write packet.

The data read packet is separated into 64-bit units according to the sequence. Bits 7 to 0 are defined as a control symbol having the value 0×FB, indicating the start of a data read/write packet.

Bits 15 to 8 are defined as a data symbol, and bits 15 to 12 are not used, and are fixed to 0. Bits 11 to 8 are more significant 4 bits of Seq[11:0], which indicates the sequence of the data read response packet.

Bits 23 to 16 are defined as a data symbol, and represent less significant 8 bits of Seq[11:0], indicating the sequence of the data read response packet. After Seq[11:0], a 32-byte (256 bits) data payload is allocated, and a 32-bit LCRC, representing the CRC of the data, follows the data payload. Finally, the control symbol 0×FD represents the end of the packet.

Describing the process for reading data using the data read response packet with reference to FIG. 4, the second conversion unit 450 transmits the data read response packet to the first conversion unit 430 using the optical signal conversion unit 440.

In this case, the data read response packet is stored in the internal buffer of the first conversion unit 430.

The data read response packet stored in the internal buffer of the first conversion unit 430 is converted and transmitted to the host computer 410 via the bus connection unit 420.

Through this process, the host computer 410 may read the data stored in the SATA storage.

Figure 14:
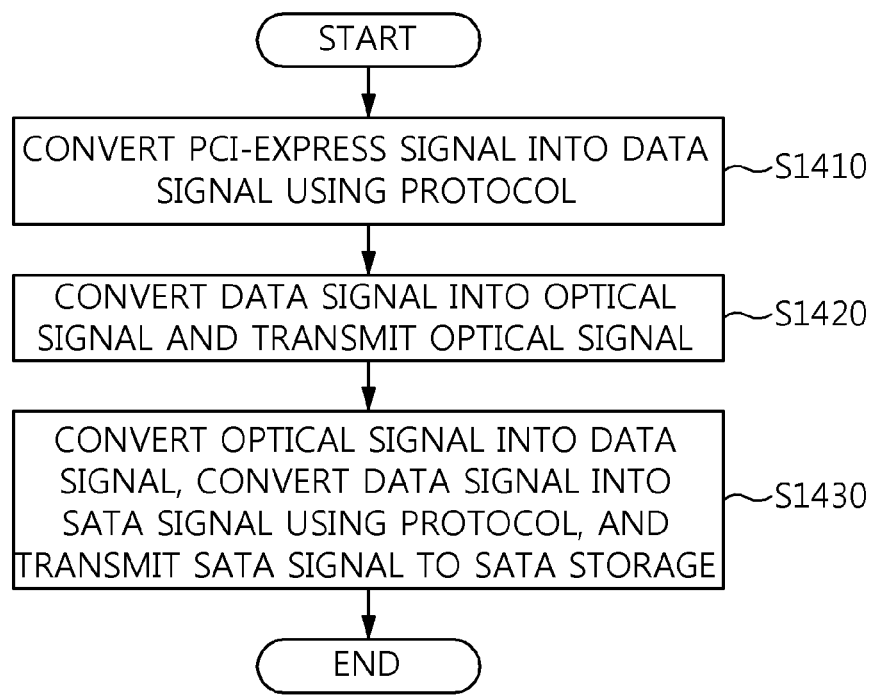
FIG. 14 is a flowchart illustrating a method for connecting SATA storage using a optical signal, according to an embodiment of the present invention.

FIG. 14 is a flowchart illustrating a method for connecting SATA storage using a optical signal according to an embodiment of the present invention.

First, the first conversion unit converts a PCI-e signal, transmitted from a host computer, into a data signal, using a protocol defined in a bus at step S1410.

Also, the optical signal conversion unit converts the data signal into a optical signal, and transmits it to a optical signal reception unit at step S1420.

Also, the second conversion unit converts the optical signal, received by the optical signal reception unit, into the data signal, converts the data signal into a SATA signal, using the protocol, and transmits the SATA signal to SATA storage at step S1430.

Because the present invention uses a optical signal to connect SATA storage and a host computer, the present invention may be used in a data center that occupies a large area.

Also, because the present invention performs data processing using a protocol that may accommodate both PCI-e signals and SATA signals, fast and effective data transmission may be realized.

Also, because the present invention uses an expensive PCI-e switch only for a optical signal add-on card, which is connected to a host computer, fewer PCI-e switches are required.

Also, because the present invention uses an existing core link between PCI-e and a bus, it may be applied to existing connections between SATA storage and host computers.

As described above, the SATA host bus adapter using a optical signal and the method for connecting SATA storage using the optical signal are not limitedly applied to the configurations and operations of the above-described embodiments, but all or some of the embodiments may be selectively combined and configured so that the embodiments may be modified in various ways.

What is claimed is:

1. A SATA host bus adapter using a optical signal, comprising:
   a first conversion unit for converting a PCI-Express signal, transmitted from a host computer, into a data signal, using a protocol defined in a bus;
   a optical signal conversion unit for converting the data signal into a optical signal, and for transmitting the optical signal to a optical signal reception unit; and
   a second conversion unit for converting the optical signal, received by the optical signal reception unit, into the data signal, for converting the data signal into a SATA signal, using the protocol, and for transmitting the SATA signal to SATA storage.

2. The SATA host bus adapter of claim 1, wherein the protocol is a protocol capable of accommodating the PCI-Express signal and the SATA signal.

3. The SATA host bus adapter of claim 1, wherein the optical signal conversion unit comprises a connection control unit for controlling connection of the first conversion unit and the second conversion unit, based on the optical signal.

4. The SATA host bus adapter of claim 3, wherein the connection control unit controls data exchange between the first conversion unit and the second conversion unit, based on the optical signal that includes one or more of a control signal, a data write signal, and a data read signal.

5. The SATA host bus adapter of claim 4, wherein the control signal includes a link number, a lane number, whether a link is connected, whether a lane is connected, a residual buffer capacity of the first conversion unit, and a residual buffer capacity of the second conversion unit.

6. The SATA host bus adapter of claim 5, wherein the connection control unit controls connection of the host computer and the SATA storage by repeatedly transmitting the control signal.

7. The SATA host bus adapter of claim 6, wherein the optical signal conversion unit transmits the optical signal to the second conversion unit, based on the residual buffer capacity of the second conversion unit.

8. A SATA host bus adapter using a optical signal, comprising:
   a first conversion unit for converting a SATA signal, transmitted from SATA storage, into a data signal using a protocol defined in a bus;
   a optical signal conversion unit for converting the data signal into a optical signal and for transmitting the optical signal to a optical signal reception unit; and
   a second conversion unit for converting the optical signal, received by the optical signal reception unit, into a data signal, for converting the data signal into a PCI-Express signal using the protocol, and for transmitting the PCI-Express signal to a host computer.

9. The SATA host bus adapter of claim 8, further comprising,
   a connection control unit for controlling connection of the first conversion unit with the second conversion unit, based on the optical signal that includes one or more of a control signal, a data write signal, and a data read signal.

10. The SATA host bus adapter of claim 9, wherein the connection control unit controls connection of the host computer and the SATA storage by repeatedly transmitting the control signal.

11. The SATA host bus adapter of claim 10, wherein the optical signal conversion unit transmits the optical signal to the second conversion unit based on a residual buffer capacity of the first conversion unit, the residual buffer capacity being included in the control signal.

12. A method for connecting SATA storage using a optical signal, comprising:
   converting, by a first conversion unit, a PCI-Express signal, transmitted from a host computer, into a data signal, using a protocol defined in a bus;
   by a optical signal conversion unit, converting the data signal into a optical signal, and transmitting the optical signal to a optical signal reception unit; and
   by a second conversion unit, converting the optical signal, received by the optical signal reception unit, into the data signal, converting the data signal into a SATA signal, using the protocol, and transmitting the SATA signal to SATA storage.

13. The method of claim 12, wherein the protocol is a protocol capable of accommodating the PCI-Express signal and the SATA signal.

14. The method of claim 12, wherein converting the optical signal is configured to control connection of the first conversion unit and the second conversion unit based on the optical signal.

15. The method of claim 14, wherein converting the optical signal comprises controlling data exchange between the first conversion unit and the second conversion unit based on the optical signal.

16. The method of claim 15, wherein the control signal includes a link number, a lane number, whether a link is connected, whether a lane is connected, a residual buffer capacity of the first conversion unit, and a residual buffer capacity of the second conversion unit.

17. The method of claim 16, wherein controlling the data exchange is configured to control connection of the host computer and the SATA storage by repeatedly transmitting the control signal.

18. The method of claim 17, wherein converting the optical signal is configured to transmit the optical signal to the second conversion unit based on the residual buffer capacity of the second conversion unit.

* * * * *